May 14, 1929. J. V. GIESLER ET AL 1,712,610
THERMOSTATICALLY CONTROLLED MIXER
Filed Nov. 29, 1926  3 Sheets-Sheet 1
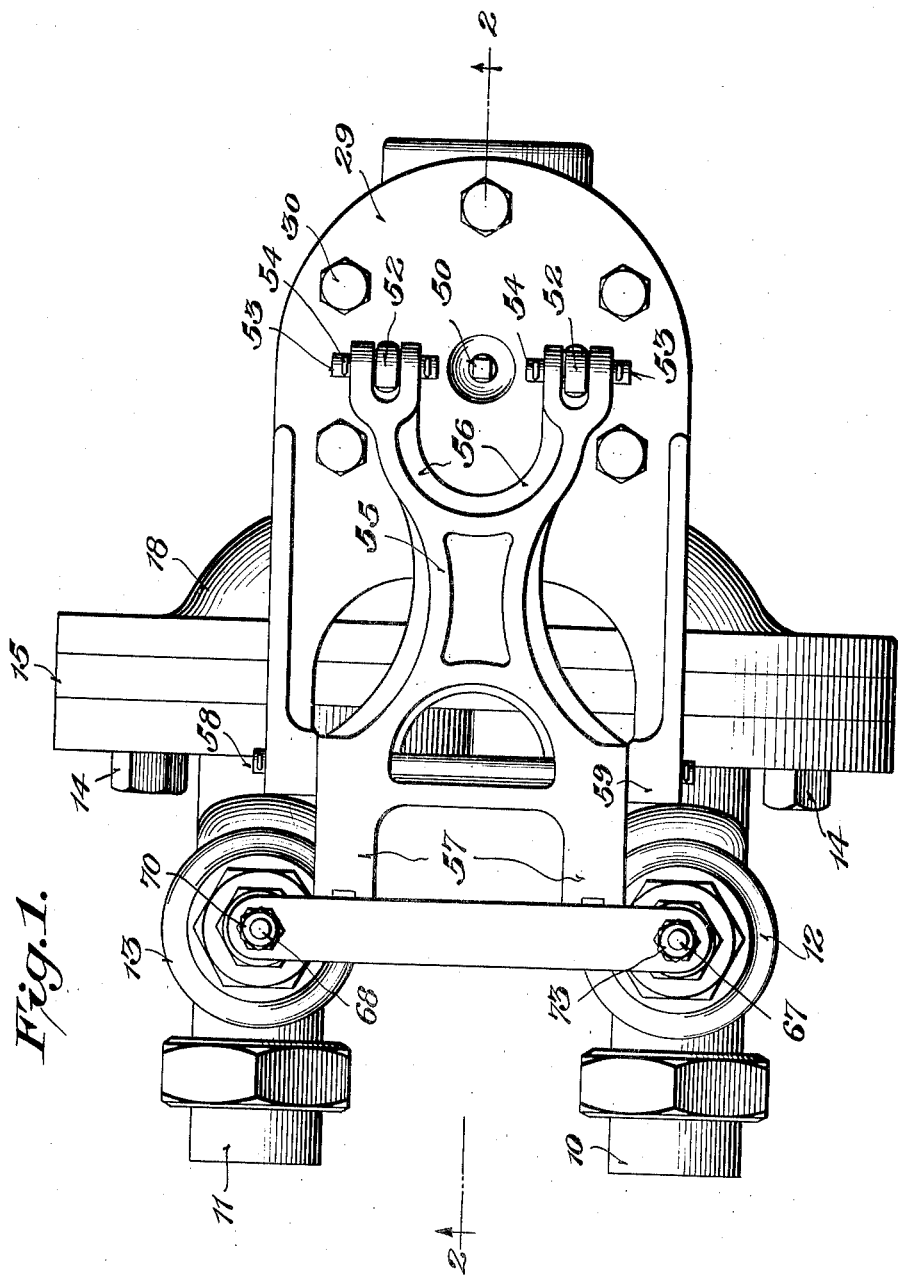

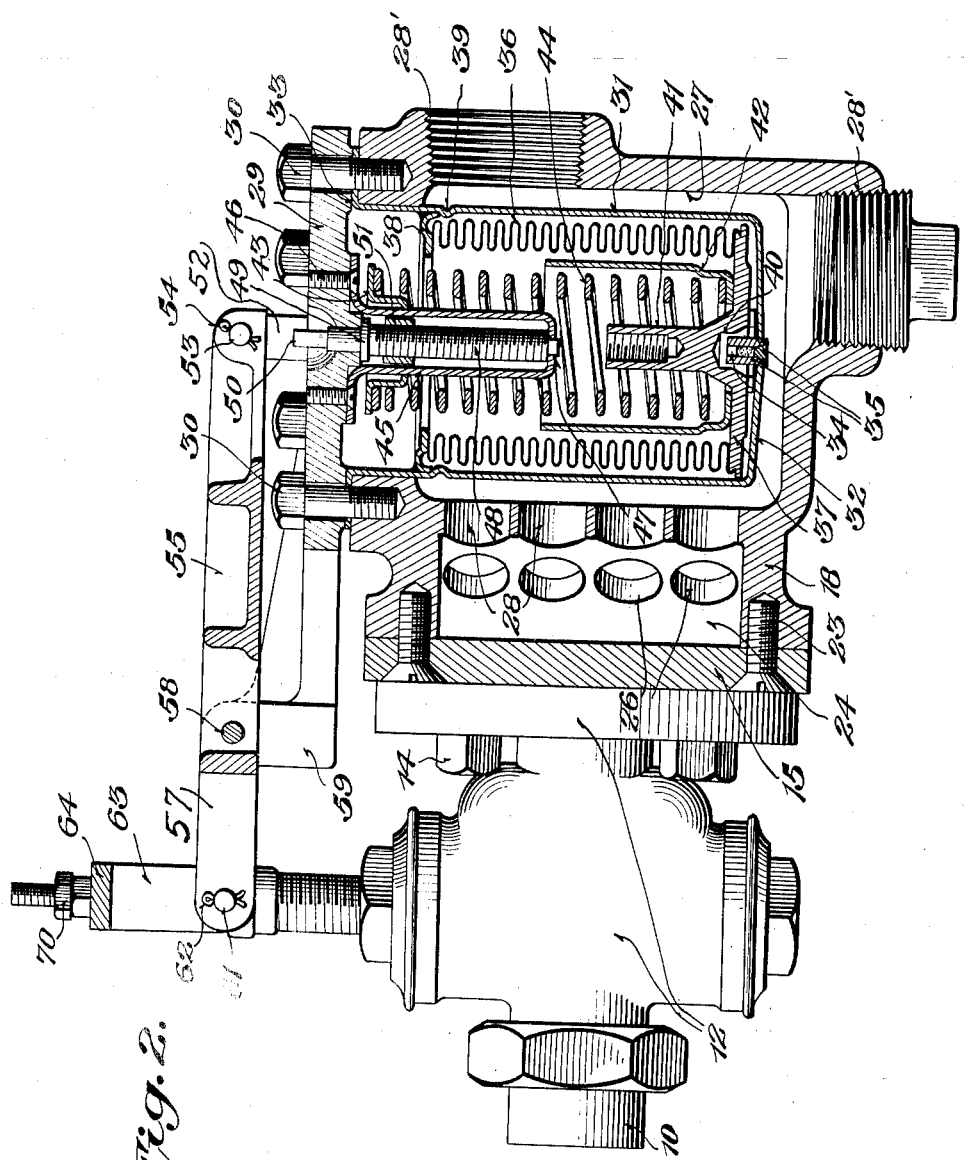

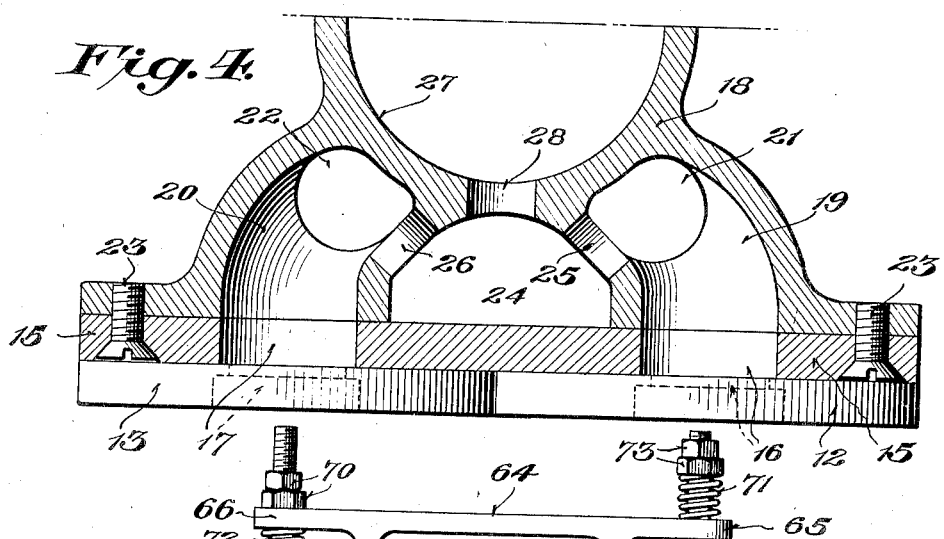
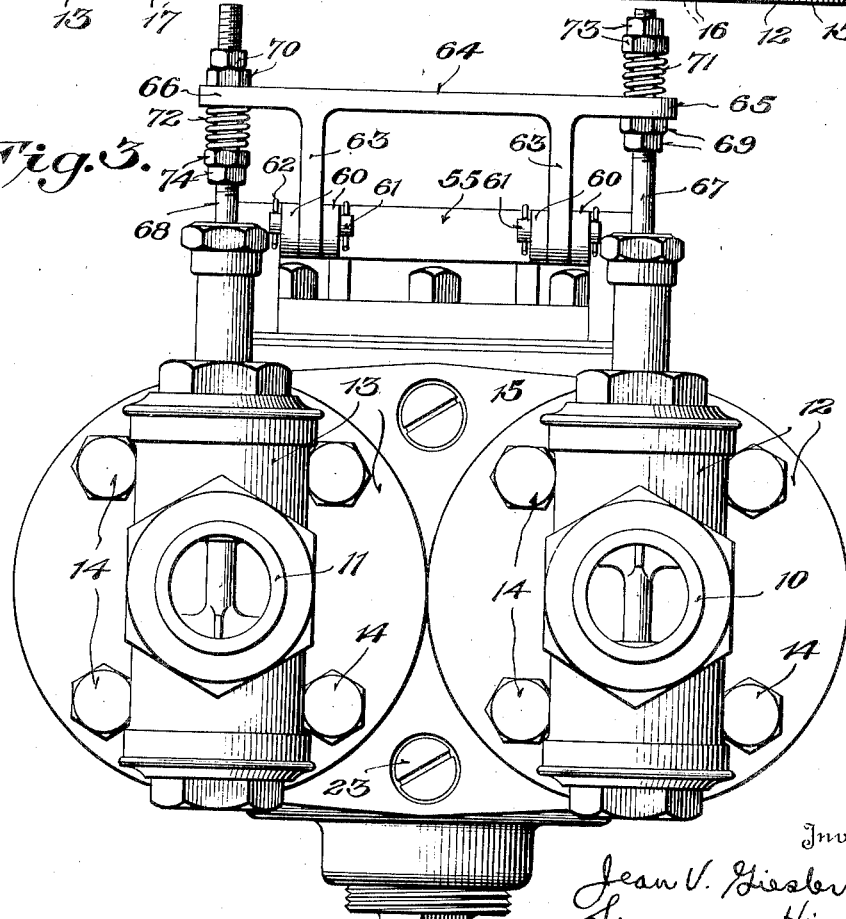

Patented May 14, 1929.

1,712,610

UNITED STATES PATENT OFFICE.

JEAN V. GIESLER, OF KNOXVILLE, AND SUMMERS HINSHAW, OF FOUNTAIN CITY, TENNESSEE, ASSIGNORS, BY MESNE ASSIGNMENTS, TO THE SYLPHON FULTON COMPANY, OF KNOXVILLE, TENNESSEE, A CORPORATION OF DELAWARE.

THERMOSTATICALLY-CONTROLLED MIXER.

Application filed November 29, 1926. Serial No. 151,516.

This invention relates to thermostatically controlled devices of the character employed as mixers for hot and cold water, although it is susceptible of embodiment in other devices for regulating the flow of a plurality of fluids, particularly where the flow is to be controlled from the temperature of the commingled fluids.

It is an object of this invention to provide a device of the character described which will maintain a substantially uniform temperature of the delivered fluid notwithstanding wide variations in the temperature or pressure or both of the fluids which are to be commingled.

Another object of this invention is to provide a device of the character described which is flexible, which permits of ready adjustment to predetermine the temperature of the delivered fluid, which contains provisions to protect the thermostatic element from variations of fluid pressure and the parts from injury in the event that the temperature continues to change after the valve mechanism has reached a limit position, and which is relatively simple and compact in structure, and yet strong and durable and efficient in operation.

Other objects will appear as the description of the invention proceeds.

The invention is capable of receiving a variety of mechanical expressions, one of which is shown on the accompanying drawings. It is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures, Fig. 1 is a plan view of a mixer embodying the present invention;

Fig. 2 is an axial section on the line 2—2 of Fig. 1;

Fig. 3 is an end view looking from the left in Fig. 1; and

Fig. 4 is a sectional view illustrating the interior construction of the chambers wherein the fluids are commingled.

In the form shown, 10 and 11 (Figs. 1 and 2) are a pair of inlet conduits of any suitable construction and leading from any suitable sources of supply of two fluids to be commingled. Taking for example a hot and cold water mixer, these conduits 10 and 11 may lead from any suitable sources of hot and cold water. Said inlet conduits 10 and 11 communicate with valve casings 12 and 13 of any suitable construction and containing valves of any suitable character. Said valve casings are mounted in any suitable way, as by cap screws 14 on a plate 15 provided with outlet apertures 16 and 17 which communicate with the passages leading from the outlet sides of the valves within casings 12 and 13, respectively.

The mixer proper is provided with a casing 18 of any suitable size, shape, material and construction, and one side of said casing is provided with a pair of inlet passages 19 and 20 (Fig. 4); for compactness and simplicity of construction, said passages 19 and 20 are elongated in the direction of the axis of casing 18, as shown at 21 and 22. Plate 15 carrying the valve casings, as heretofore described, may be mounted on the casing 18, with its apertures 16 and 17 in register with the inlet passages 19 and 20, respectively, in any suitable way, as by screws 23. Intermediate the inlet passages and chamber 19, 21 and 20, 22, is a mixing chamber 24, also elongated in the direction of the axis of the casing 18 and preferably extending throughout the length of said casing, and the wall between said mixing chamber 24 and each of said inlet chambers 21 and 22, respectively, is provided with one or more apertures 25 and 26, respectively. Owing to the relative location of the inlet passages and chambers, on the one hand, and the mixing chamber, on the other hand, together with the apertures 25 and 26 whereby said inlet chambers communicate with the mixing chamber, the fluid entering through the inlet passages and chambers is nearly reversed in its direction of flow and enters the mixing chamber 24 in two currents which are flowing at a large angle with respect to each other, on the order of a ninety degrees angle, and also in the general direction opposite from that in which they flow into the mixer casing. Communicating with the mixing chamber 24 is a thermostat chamber 27 which also preferably extends throughout the length of the casing 18 parallel to the chamber 24, a plurality of apertures 28 (Figs. 2 and 4) being preferably provided in the wall intermediate said chambers. In order to flow into the thermostat chamber, therefore, the fluid in the mixing chamber 24 again has to be substantially reversed in direction so that it is again flowing in substantially the same direction as that in which the fluids first entered the casing of the mixer proper. These reversals in the direction of flow, together with the interposition of a mixing chamber between the inlet chambers and the thermostat chamber into which the currents of fluid flow at a large angle with respect to each other have been found to be very effective in causing an intimate commingling of the two fluids and the avoidance of the stratification which is so frequently found in mixers, particularly mixers designed for the commingling of hot and cold water. Thereby are avoided the difficulties heretofore experienced with hot and cold water mixers in discharging water which is sometimes too hot and sometimes too cold.

The thermostat chamber 27 is provided with one or more outlet openings 28' suitably arranged and constructed for the convenient attachment of outlet piping to lead the commingled fluids to the place or places where it is to be employed. Said chamber is also open at one end to receive the thermostatic mechanism to be described, said open end being closed by a plate 29 of any suitable form, size and construction and attached to the casing 18 in any suitable way, as by cap screws 30.

While within the broader aspects of this invention the thermostat may be of any suitable construction, the preferred construction includes an expansible and collapsible thermostatic chamber which is so constructed as to eliminate any effect thereon of changes which may occur in the pressure of either or both of the fluids being mixed. In the form shown a rigid cup 31 of any suitable size, material and construction has a closed end 32 depending within the chamber 27 and an open flanged end 33 by which the cup may be mounted in position, said flange being shown as clamped between the casing wall 18 and the plate 29 and retained in said position by the cap screws 30. The cup end 32 may be provided with a suitable filling opening 34, shown as closed by a stopper and solder 35. Within said cup 31 is an expansible and collapsible vessel 36 of any suitable construction, shown as a deeply corrugated highly flexible tubular metal wall, preferably of resilient metal, suitably attached, as by soldering or brazing, at its opposite ends to a movable end wall 37 and a stationary end wall 38 which takes the form of an outwardly directed flange which may be secured within the cup 31 in any suitable way as by engagement with an annular shoulder 39 formed in the cup 31. Said wall 38 should also be soldered to the cup 31 so as to prevent relative displacement. Said movable end wall 37 may be provided with a recess 40 to receive the filling pipe 34, when such is used, and it may also be provided with an axially extending centering post 41.

The space between the cup 31 and the corrugated wall 36 is charged with a volatile fluid of any suitable character and upon variations in the fluid pressure the corrugated wall 36 will be expanded or contracted by the action of the fluid pressure on the movable end wall 37. As only the cup 31 is subjected to the pressure of the fluids passing through the chamber 27, variations in the pressure of said fluids can have no effect upon the expansion or contraction of the corrugated wall 36, and thereby are eliminated difficulties heretofore experienced where the expansible and collapsible vessel has been subjected to the pressure within the thermostat chamber so that variations of pressure have added to or subtracted from the pressure of the contained thermosensitive fluid, so that close regulations of the temperature have been impossible in the presence of variations of pressure in the fluids being controlled.

Mounted on the movable end wall 37, and preferably loosely engaging the same, is a spring cup 42 and extending between the movable end wall 37, where it is centered by said cup 42, and a spring abutment plate 43 is a coil spring 44 for exerting a predetermined resistance to the action of the thermostat. Abutment plate 43 is preferably adjustable so as to vary its position and the tension of the spring 44 to the end that the predetermined resistance to the action of the thermostat may be varied in order to vary the temperature of the commingled fluids delivered by the mixer. To this end, plate 43 is slidably mounted on a guide tube 45 which may be mounted on the under side of the plate 29 as by screws 46. Rotatably mounted within the plate 29 and an aperture 47 at the end of said guide tube is an adjusting screw 48 provided with a shoulder 49 adjacent its outer end whereby said screw is retained against displacement by the engagement of the inner end of the screw in the aperture 47 and the engagement of the shoulder 49 against the inner side of the plate 29. The outer end of screw 48 is provided with a suitably shaped projection 50 whereby it may be engaged by a key which fits the same in order to permit of adjustment of the screw. The key may then be removed to prevent tampering with the setting of the device. Mounted on the screw 48 is a nonrotatable nut 51 which is provided with a pair of ears (not shown) which slide in axially extending slots in the guide tube 45, whereby rotation of the said nut 51 is prevented, said ears also engaging the spring abutment plate 43 so that the latter is caused to slide back and forth on the guide tube 45 with the nut 51 thereby increasing or decreasing the tension of the spring 44.

Spring cup 42 is provided with a pair of axially extending arms 52 which extend parallel to the adjusting screw 48 and guide tube 45 on either side of the latter and project through slots in the plate 29, as shown in Fig. 1. Pivotally connected to said arms 52, as by pivot pins 53 suitably retained in position as by cotter pins 54, is a bifurcated lever 55 having a pair of arms 56 at one end, for attachment to said arms 52, and a pair of arms 57 at its opposite end, for attachment to the valve operating mechanism. Said lever is fulcrumed in any suitable way, being shown as mounted on a pivot pin 58 carried by a suitable bracket projection 59 on the cover plate 29.

The outer ends 57 of said lever 55 are slotted, as shown at 60 in Fig. 3, and are pivotally connected, as by pivot pins 61 suitably retained in position as by cotter pins 62, to the arms 63 of a yoke 64 which has laterally extending arms 65 and 66. Said arms 65 and 66 are apertured to receive the spindles 67 and 68 of the valve mechanism respectively contained in the valve casings 12 and 13. Said valve mechanism is so constructed that one valve opens as the other closes, and therefore the yoke 64 is so connected to the valve stems 67 and 68 that movement of the yoke 64 in either direction is accompanied by a corresponding opening and closing movement of the respective valves. In the form shown, the position of the yoke 64 will respect to the valve stems 67 and 68 is determined by lock nuts 69 and 70 which respectively engage opposite sides of the arms 65 and 66. The yoke arms 65 and 66 are held in engagement with the lock nuts 69 and 70, respectively, by coil springs 71 and 72 mounted on the stems 67 and 68, respectively, and retained thereon by lock nuts 73 and 74, respectively. Said coil springs 71 and 72 permit overthrow movement of the yoke 64 in the event that the lever 55 is moved by the thermostat after one or the other of the valve members engages its seat so as to limit the extent of movement of the corresponding valve stem attached thereto. Thus if 13 is the hot water inlet valve and expansion of the thermostat has depressed the yoke 64, as viewed in Fig. 3, so as to seat the hot water valve, a continued expansion of the thermostat cannot bend or break the parts because a further depression of the yoke 64 will compress the spring 72 without moving the stem 68.

In operation, the adjusting screw 48 may be rotated by engagement of the key with the end 50 of said screw so as to predeterminately adjust the spring 44 to maintain the desired temperature. Assuming that two fluids, as hot and cold water, are flowing through the inlet pipes 10 and 11, the inflowing fluids enter the mixer proper through the valve mechanisms 12 and 13 and inlet passages 19 and 20 to the chambers 21 and 22, where the direction of flow is nearly reversed. The two currents then enter the mixing chamber 24, meeting at a large angle, and are thoroughly and intimately commingled. The direction of flow is then again nearly reversed, and the commingled currents enter the thermostat chamber 27 where the temperature of the commingled fluids is effective to act on the thermostat. If the temperature rises or falls above the desired temperature, the pressure within the thermostat is promptly varied by the change in temperature and the thermostat expands or contracts, as the case may be, to operate the lever 55 and simultaneously open one valve and close the other by corresponding amounts, to adjust the flows so as to maintain the desired temperature. The thermostat, while sensitively responsive to variations in the temperature of the commingled currents is unaffected by the changes of pressure in said currents and therefore is responsive only to temperature variations. The thermostat acts directly and positively on both valves at the same time, moving them corresponding amounts and assuring corresponding and accurate adjustment of the valve mechanism so as to vary the respective quantities of fluid flowing through the respective inlets as needed to maintain the uniform temperature in the discharged fluid. In the event that either valve is moved to a limit position and the expansion or contraction of the thermostat does not cease immediately, the overthrow of the lever 55 will not injure the parts because of the provision for overthrow movement.

It will thus be perceived that a thermostatically controlled mixer has been provided which is simple and compact in structure and yet strong, durable and efficient. It may be accurately adjusted to maintain any desired temperature and is flexible because it may be operated under a wide range of temperatures. At the same time it is unaffected by variations in pressure. A thorough commingling of the fluids is assured and stratification of the fluids avoided by the arrangement of inlets and mixing chambers, while this intimate commingling is effected before the thermostat is reached so that the latter is not responsive to strata of one or the other of the fluids. Moreover, the parts are so constructed that injury is avoided by overthrow of the lever which operates the valve mechanism.

While the embodiment of the invention illustrated on the drawings has been described with considerable particularity, it is to be expressly understood that the invention is not restricted thereto, as the same is capable of receiving a variety of mechanical expressions, some of which will now readily suggest themselves to those skilled in the art, while changes may be made in the details of construction, arrangement and proportion of parts, without departing from the spirit of this invention. Reference is therefore to be had to the appended claims for a definition of said invention.

What is claimed is:

1. In a thermostatically controlled mixer, in combination with a plurality of inlet conduits and valve mechanism associated therewith, a thermostat operatively connected to said valve mechanism, a chamber for said thermostat, inlet chambers for the respective fluids extending substantially the full length of said thermostat chamber and separated therefrom, said inlet chambers being in communication with said inlet conduits, and a mixing chamber between and communicating with said inlet chambers and said thermostat chamber and extending substantially the full length of said thermostat chamber.

2. In a thermostatically controlled mixer, in combination with a plurality of inlets and valve mechanism associated therewith, a thermostat chamber, a thermostat in said thermostat chamber, said thermostat including a rigid wall subjected to the pressure in said chamber, an expansible and collapsible wall confined within said rigid wall and subjected to the action of a thermosensitive fluid between said walls, said expansible and collapsible wall being attached to a movable end wall, a cup mounted on said movable end wall, a spring within said cup and opposing expansion of said thermostat, and a lever operatively connected to said cup and to said valve mechanism.

3. In a thermostatically controlled mixer, in combination with a plurality of inlets and valve mechanism associated therewith, a thermostat chamber, a thermostat in said thermostat chamber, said thermostat including a rigid wall subjected to the pressure within said chamber, an expansible and collapsible wall confined within said rigid wall and attached to a movable end wall, said movable end wall being subjected to the pressure of a thermosensitive fluid and confined between said walls, a cup mounted on said movable end wall, a spring interposed between said cup and an adjustable abutment, and a lever operatively connected to said cup and to said valve mechanism.

4. In a thermostatically controlled mixer, in combination with a plurality of inlets and valve mechanism associated therewith, a thermostat chamber, a thermostat in said thermostat chamber, said thermostat including a rigid wall subjected to the pressure within said chamber, an expansible and collapsible wall confined in said rigid wall and attached to a movable end wall, said movable end wall being subjected to the pressure of a thermosensitive fluid confined between said walls, a cup mounted on said movable end wall, a cover plate closing said chamber, a guide member mounted on said cover plate, a screw rotatably mounted in said cover plate, an adjustable abutment slidably mounted on said guide member and actuated by the rotation of said screw, a spring between said abutment and said cup on said movable end wall, and a lever operatively connected to said last named cup and said valve mechanism.

5. In a thermostatically controlled mixer, in combination with a plurality of inlet conduits and valve mechanism associated therewith, a thermostat chamber, a thermostat in said last named chamber, a lever operatively connected to said thermostat, a yoke operatively connected to said lever and provided with arms, valve stems on said valve mechanism engaged in apertures in said arms, means on said valve stems engaging said yoke whereby said stems are moved equally in the same direction by the movement of said yoke, and resilient means engaging each of said arms whereby said yoke may move after said valve stems reach a limit position.

6. In a thermostatically controlled mixer, the combination of a plurality of parallel inlet conduits conducting the incoming liquid in the same direction, a mixing chamber between said conduits, inlet passages from said conduits to said mixing chamber, said inlet passages extending in an approximately reverse direction to the flow of the liquid in said passages, and the passages from the respective conduits being substantially at right angles to each other, a thermostatic chamber, passages from said mixing chamber to said thermostatic chamber and located between said passages and leading in a reverse direction thereto, a thermostat in said thermostatic chamber, valve mechanism controlling the inlet conduits, and operative connections between said thermostat and valve mechanism.

In testimony whereof we have signed this specification.

JEAN V. GIESLER.
SUMMERS HINSHAW.

CERTIFICATE OF CORRECTION.

Patent No. 1,712,610.                                                   Granted May 14, 1929, to

JEAN V. GIESLER ET AL.

It is hereby certified that the assignee in the above numbered patent was erroneously described and specified as "The Sylphon Fulton Company", whereas said assignee should have been described and specified as "The Fulton Sylphon Company" as shown by the records of assignments in this office; and that the said Letters Patent should be read with this correction therein that the same may conform to the record of the case in the Patent Office.

Signed and sealed this 18th day of June, A. D. 1929.

(Seal)

M. J. Moore,
Acting Commissioner of Patents.